May 31, 1966
F. RAY
3,253,702
CONTACT LENS HOLDER
Filed July 18, 1963
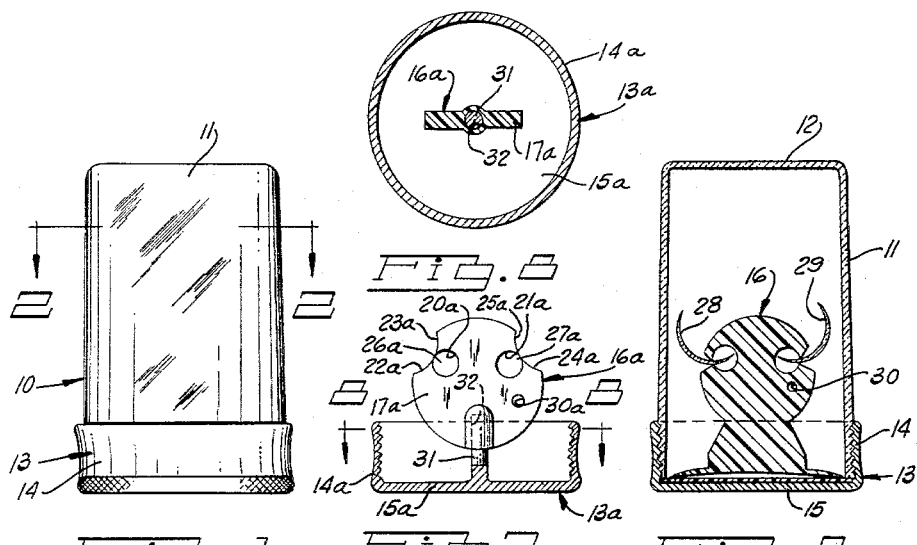
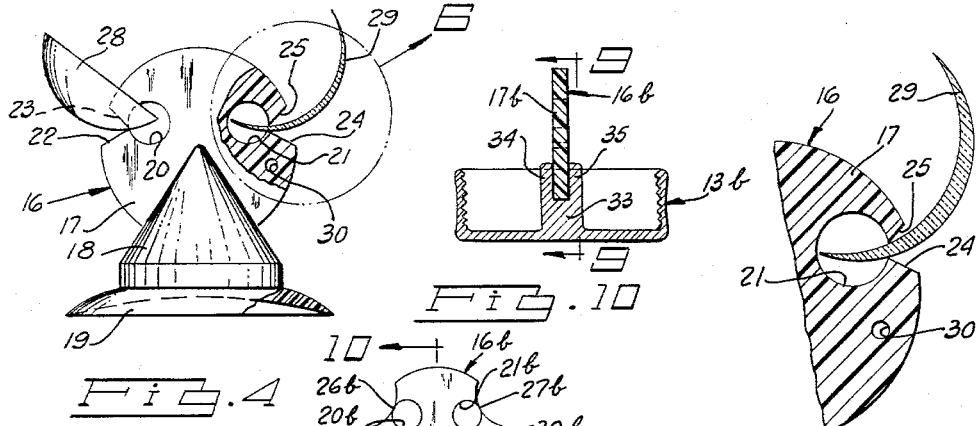
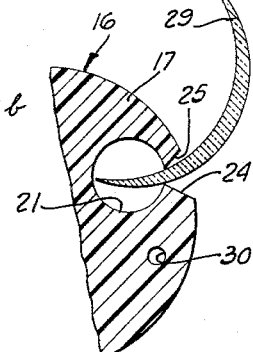
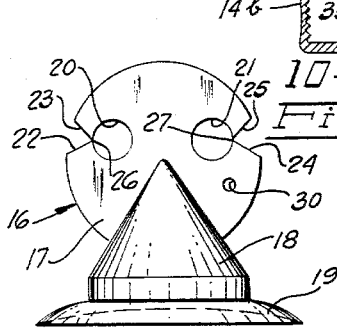
INVENTOR.
FRANK RAY

United States Patent Office 3,253,702
Patented May 31, 1966

3,253,702
CONTACT LENS HOLDER
Frank Ray, Detroit, Mich., assignor to Raycraft Plastics, Inc., Detroit, Mich., a corporation of Michigan
Filed July 18, 1963, Ser. No. 295,959
5 Claims. (Cl. 206—5)

This invention relates generally to a contact lens container, and more particularly, to a contact lens holder means which may be used with a container receptacle or independently of the retainer receptacle.

It is the primary object of the present invention to provide a contact lens holder which is adapted to grip a contact lens in a line contact on both sides of the lens so as to leave the edges of the lens completely free for gripping the lens for insertion and removal purposes.

It is another object of the present invention to provide a novel and improved contact lens holder wherein the lenses are suspended between two pointed rubber prongs so that the whole surface of the lenses on each side are exposed to a rinsing action while in the contact lens container.

It is further object of the present invention to provide a novel and improved contact lens holder which is compact and simple in construction, efficient in operation and economical to manufacture.

It is still another object of the present invention to provide a novel and improved contact lens holder which is adapted to be used with a fluid-tight container and be attached to the cap of the container in a fixed or detachable manner whereby the lens holder may be used independently from the container.

Other objects, features and advantages of this invention will be apparent from the following detailed description, appended claims, and the accompanying drawing.

In the drawing:

FIG. 1 is an elevational view of a contact lens container incorporating the lens holder of the present invention;

FIG. 2 is a horizontal sectional view of the structure illustrated in FIG. 1, taken along the line 2—2 thereof and looking in the direction of the arrows;

FIG. 3 is an elevational sectional view of the structure illustrated in FIG. 2, taken along the line 3—3 thereof and looking in the direction of the arrows;

FIG. 4 is an enlarged elevational view of the contact lens holder illustrated in FIG. 3, with parts broken away and shown in section, and showing a first embodiment of the invention with a pair of contact lenses mounted thereon;

FIG. 5 is a side elevational view of the contact lens holder shown in FIG. 4 and with the contact lenses removed;

FIG. 6 is an enlarged elevational, fragmentary, view of the structure illustrated in FIG. 4 within the circle marked 6;

FIG. 7 is an elevational sectional view of a second embodiment of the invention;

FIG. 8 is a horizontal sectional view of the structure illustrated in FIG. 7, taken the line 8—8 thereof and looking in the direction of the arrows;

FIG. 9 is an elevational sectional view of a third embodiment of the invention, taken along the line 9—9 of FIGURE 10, and looking in the direction of the arrows; and, FIG. 10 is an elevational sectional view of the structure illustrated in FIG. 9, taken along the line 10—10 thereof and looking in the direction of the arrows.

Referring now to the drawing and in particular to FIGS. 1 through 6, the numeral 10 generally indicates a contact lens case or container which is illustrated as being a cylindrical receptacle. The container 10 is provided with the cylindrical side wall 11 and the closed end wall 12 at one end thereof, and it is open at the other end thereof. The container 10 is closed at the open end thereof by means of the cap or cover 13 which is detachably mounted on the open end of the container 10 by any suitable means as a thread connection or the like so as to provide a fluid-tight connection therebetween. The cap side wall is cylindrical and it is indicated by the numeral 14. The cap is enclosed by the end wall 15. The container 10 and the cap 13 may be made from any suitable material as a plastic material, or the like. A suitable plastic material is acrylic plastic.

Mounted on the inner side of the cap end wall 15 is a contact lens holder generally indicated by the numeral 16. Contact lens holder 16 is preferably made from a suitable resilient or rubber material such as a surgical rubber, or any suitable soft rubber. The contact lens holder 16 includes the body member 17 which is shown as a flat disc or circular body. It will be understood, however, that the body member 17 may be formed to any other desired shape. The body member 17 is integrally mounted on the upper end of the supporting base member 18 which is integrally connected at the bottom end thereof to the suction cup 19. The suction cup 19 is adapted to be detachably connected to the inner side of the cap wall 15 in the usual manner. It will also be seen that the contact lens holder 16 may be used independently from the container cap, or the cap can be sent down on a table for holding the lenses for fitting purposes.

As shown in FIGS. 4, 5 and 6, the body member is provided with a pair of laterally spaced apart openings or holes 20 and 21 which communicate with a pair of notches formed in the opposite sides of the body member. A first notch is formed on one side of the body member and is defined by the lines 22 and 23 and communicates with the openings 20 by means of a slit in the form of a line as indicated by the numeral 26 in FIG. 5. A second slit is defined by the lines 24 and 25 and communicates with the opening 21 to form the line slit 27. The contact lenses 28 and 29 may be quickly and easily mounted in the lens holders formed by the aforementioned openings and notches by grasping the lenses on the edges thereof and moving them into the notches and through the line slits and into the adjacent or communicating openings 20 and 21. The line edges of the body member 16 which form the line slits 26 and 27 grip the lenses in a line contact whereby the substantially entire area of the contact lens may be in contact with the cleaning fluid or the like in the container 10 when the cap is mounted on the same and inverted from the position shown in FIG. 1 and with fluid in the container 10. A small opening or hole 30 is formed through one side of the body member 16 to identify the position of the right and left lenses.

It will be seen that the contact lens holder of the present invention suspends the lenses between two pointed rubber prongs so that substantially the entire surfaces of the lenses on each side is exposed to a rinsing action while in the container 10. In the prior art contact lens holders, it is difficult to insert the contact lenses and to find the proper place for the lenses. It has been found that many lenses were broken by forcing them into the wrong place in the case. Experience has shown that with the new holder, the user can insert the contact lenses in the proper places with closed eyes and without damage to the lenses. The contact lenses 28 and 29 may be easily removed from the holder body 16 by grasping the edges of the lenses without touching any part of the surface so that no finger prints are left on the lenses. With the holder of the present invention, the lenses may be rinsed in running water very thoroughly and over the entire surface thereof since the lenses are merely suspended between two line points and the mechanical action of the running water will cleanse the entire surface on each side of the lens. With the prior art type contact lenses, a certain size holder must be made for each size contact lenses, while in the present device any size or cornea contact lens may be held by the holder. The soft rubber or resilient material used in making the body member 16 will not scratch the lenses. It has been found that the lens holder of the present invention is very useful in tinting contact lenses. The tinting fluid is put into the container 10 and the cap 15 is screwed in place with the contact lens holder 16 carrying the lenses which are to be tinted. With the the cap 15 tightly applied, the lenses may be tinted by a slight rocking motion of the container 10, and an even color is produced on both surfaces of the lenses. The tinting time may be one, two or three minutes, depending upon the desired shade. The ability to tint a pair of lenses simultaneously permits the user to more efficiently tint a pair of lenses. The tinting action is terminated by unscrewing the cap 15 and rinsing the lenses in water whereby they are ready for use.

The lens holder of the present invention is also adaptable for use by practioners. In this case, they are used independently of the container 10. During a fitting operation, the doctor usually has several sets of contact lenses available and they are inserted in the eyes of many people and this action requires the sanitary handling of these fitting lenses. The contact lens holder of the present invention permits the contact lenses to be quickly mounted on the holder and put in a container provided with a suitable detergent liquid in a fast and efficient manner for cleaning the lenses.

It is also obvious that the container 10 and cap 13 when provided with the contact lenses holder 16 provides and efficient and improved contact lens carrying case. Any suitable soaking solution may be used in the container when it is used for such a purpose.

FIGS. 7 and 8 disclose a second embodiment of the invention and the parts which are similar to the first embodiment are marked with the same reference numerals followed by the small letter *a*. In this embodiment, the contact lens holder body member 17*a* is mounted on a base member 31 which is integrally formed on the inner side of the cap wall 15*a*. The base member is shown in the form of a circular post which is adapted to be inserted into the post hole 32 formed on the lower side of the contact lens holder body 17*a*. The embodiment of FIGS. 7 and 8 functions in the same manner as the embodiment of FIGS. 1 through 6. It will be noted that the notches formed in the holder of body 17*a* are formed with curved lines instead of straight lines as shown in the first embodiment.

FIGS. 9 and 10 illustrate a third embodiment of the invention wherein the parts which are similar to the first embodiment are marked with corresponding reference numerals followed by the small letter *b*. In this embodiment, the contact lens holder body 17*b* is mounted on the base member 33 which is formed integral on the inner side of the cap wall 15*b*. The base member 33 is provided on the upper end thereof with the pair of laterally spaced apart prongs 34 and 35 which are adapted to grip the lower side of the holder body member 17*b* and secure the same in place. The embodiment of FIGS. 9 and 10 functions in the same manner as the embodiment of FIGS. 1 through 6.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a contact lens container including a receptacle and a detachable fluid-tight cap for the receptacle a contact lens holder means comprising: a resilient body member; means for attaching said body member to the cap; a pair of spaced apart openings formed through said body member; a notch formed into each side of said body member and terminating at its inner end in a line slit communicating with one of said openings; each of said openings and communicating notches comprising a contact lens holder, whereby a contact lens may be inserted into each notch and into the communicating opening through the line slit and be held in such position by the line portions of the body member which form the line slit.

2. The structure as defined in claim 1, wherein: said means for attaching said body member to the cap includes a suction cup engageable with said cap, and a base member interconnecting said body and suction cup.

3. The structure as defined in claim 1, wherein: said means for attaching said body member to the cap includes a base member connected to said cap, and said body member being provided with a hole for the reception of said base member to mount the body member thereon.

4. The structure as defined in claim 1, wherein: said means for attaching said body member to the cap includes a base member connected to said cap, and said base member being provided with a pair of prongs for clamping the body member on said base member.

5. A contact lens holder comprising: resilient body member; said body member being mounted on a suction cup; a pair of spaced openings formed through said body member; a notch formed into each side of said body member and terminating at its inner end in a line slit communicating with one of said openings; each of said openings and communicating notches comprising a contact lens holder, whereby a contact lens may be inserted into each notch and into the communicating opening through the line slit and be held in such position by the line portions of the body member which form the line slit.

References Cited by the Examiner

UNITED STATES PATENTS

| | | | |
|---|---|---|---|
| 2,398,060 | 4/1946 | Alstyne | 220—69 |
| 2,967,607 | 1/1961 | Hollinger | 206—5 |
| 2,996,171 | 8/1961 | Hollinger | 206—5 |
| 3,054,412 | 9/1962 | Nickell | 206—5 |
| 3,083,819 | 4/1963 | Entzminger | 206—5 |

LOUIS G. MANCENE, *Primary Examiner.*

THERON E. CONDON, *Examiner.*